No. 818,198. PATENTED APR. 17, 1906.
J. C. SCHLEICHER.
VEHICLE WHEEL.
APPLICATION FILED JULY 14, 1905.
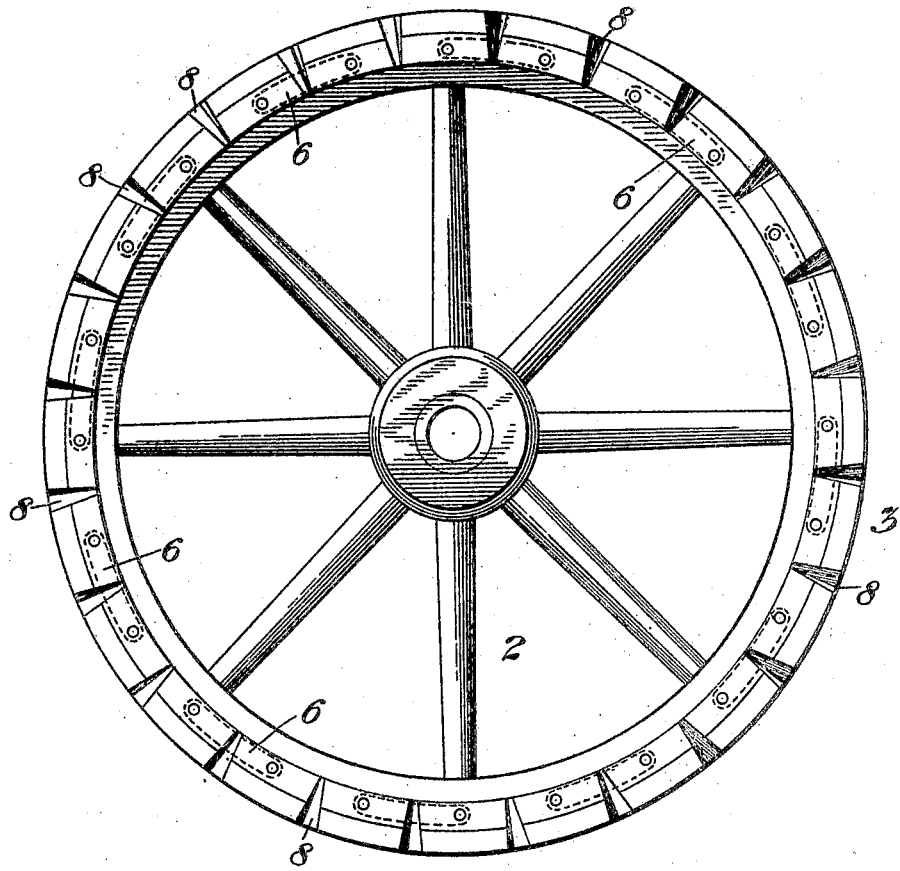
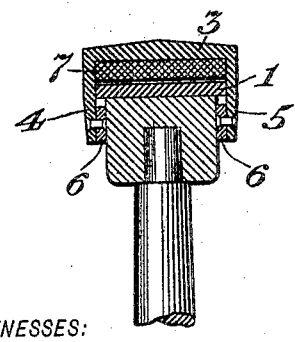
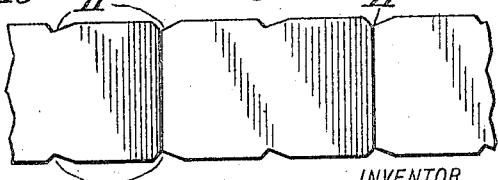
WITNESSES:
INVENTOR
John C. Schleicher
BY his ATTORNEY

UNITED STATES PATENT OFFICE.

JOHN C. SCHLEICHER, OF MOUNT VERNON, NEW YORK.

VEHICLE-WHEEL.

No. 818,198.     Specification of Letters Patent.     Patented April 17, 1906.

Application filed July 14, 1905. Serial No. 269,589.

*To all whom it may concern:*

Be it known that I, JOHN C. SCHLEICHER, a citizen of the United States, and a resident of Mount Vernon, in the county of Westchester and State of New York, have invented certain new and useful Improvements in Vehicle-Wheels, of which the following is a specification.

My invention relates to cushioned tires for wheels.

It has for its object to provide a cushioned tire comprising a continuous inner tire, a hollow sectional linked outer tire secured on and movable with relation to said inner tire, and a spring-cushion placed between said tires, whereby when weight is placed on the wheel the outer tire is pushed inwardly, contracting said spring-cushion, and when the wheel is relieved of the weight the spring-cushion will force the outer tire outwardly.

It has for a further object to provide notches in the edges of the outer tire whereby when the edges of the wheel come into contact with a rail the notches will engage it and raise the wheel thereon instead of the wheel sliding along it, as would be the case if no notches were provided.

It has for a further object to provide a device of the character set forth embodying advantages in point of strength, durability, and simplicity and inexpensiveness of construction.

In the drawings, Figure 1 is a side view of a wheel provided with my cushioned tire. Fig. 2 is an enlarged fragmentary sectional view thereof. Fig. 3 is a fragmentary plan view of the outer tire. Fig. 4 is an enlarged fragmentary plan view of a modified form of the outer tire, showing rail-engaging notches on both sides thereof.

Corresponding parts in all the figures illustrating my invention are designated by the same reference characters.

Referring to Figs. 1 to 3, inclusive, 1 designates the continuous inner metallic tire, which is secured to and projected beyond the felly of the wheel 2 on each side to form continuous circular flanges. An outer inverted U-shaped sectional steel tire 3 is placed over the inner tire 1, so that the downwardly-extending side portions 4 and 5 embrace and project below the flanges formed by the projecting edges of the inner tire and links 6 bear against the inside faces of the downwardly-extending portions 4 and 5 and are pivotally connected at each end to adjacent ends of said projections just below the tire 1, and thereby hold the sectional tire in place and allow it to move with relation thereto. A circular cushion 7, of rubber or other elastic material, is placed within the hollow outer tire and rests on the inner tire for the purpose of taking the jar of the outer tire. To provide means for the easy engagement of the outer tire with railroad-tracks, notches 8 are made in the outside edges.

Referring now to the modification shown in Fig. 4, this tire 10 only differs from that of the other figures in that it is provided with notches 11 in each edge.

From the construction above described, considered in connection with the drawings, it will be understood that when a load is placed on a vehicle having wheels employing my tires or when the wheels strike an obstruction the outer tire will be forced inwardly, compressing the spring-cushion interposed between it and the inner tire, and when relieved from the load or after the shock of striking the obstruction the outer tire will be forced outwardly again by the expansion of the interposed spring-cushion and its outerward movement will be limited by the links coming into contact with the under face of the outer edges of the inner tire.

I do not wish to be understood as limiting myself to the precise details and arrangement of parts shown and described, but reserve the right to all modifications within the scope of my invention.

Having now described my invention, what I claim as new, and desire to secure by Letters Patent, is—

1. In a wheel-tire, the combination with an inner solid fixed tire its edges projecting beyond the felly of the wheel and forming circular flanges, of an outer sectional tire having downwardly-extending portions embracing the inner tire and links pivotally connected to the inner faces of said sections below the flanges of the inner tire, substantially as described.

2. In a wheel-tire, the combination with an inner fixed tire its edges projecting beyond the felly of the wheel and forming circular flanges, of an outer sectional tire having downwardly-extending portions embracing the inner tire, links pivotally connected to inner faces of said sections below the flanges of the inner tire and a cushion located between said tires, substantially as described.

Signed at New York, in the county of New York and State of New York, this 10th day of July, A. D. 1905.

JOHN C. SCHLEICHER.

Witnesses:
CHAS. L. WOLF,
ALBERT B. BLACKWOOD.